United States Patent [19]
Marlier et al.

[11] Patent Number: 5,880,428
[45] Date of Patent: Mar. 9, 1999

[54] LASER WELDING LINE FOR REPAIRING A CLOSURE FAULT OF A METAL TUBE CONTAINING AT LEAST ONE TRANSMISSION OPTICAL FIBER

[75] Inventors: Géry Marlier; Didier Fasquel, both of Calais, France

[73] Assignee: Alcatel Submarcom, Clichy, France

[21] Appl. No.: 927,080

[22] Filed: Sep. 10, 1997

Related U.S. Application Data

[62] Division of Ser. No. 501,296, Jul. 12, 1995, Pat. No. 5,700,990.

[30] Foreign Application Priority Data

Jul. 22, 1994 [FR] France ............................ 94 09 104

[51] Int. Cl.⁶ .................................................. B23K 26/00
[52] U.S. Cl. .............................. 219/121.63; 219/121.82
[58] Field of Search ........................... 219/121.6, 121.63, 219/121.64, 121.82; 29/402.01, 402.19, 402.21; 228/119, 148, 173.1, 173.4

[56] References Cited

U.S. PATENT DOCUMENTS

| 4,580,874 | 4/1986 | Winter et al. ............................ 385/99 |
| 4,759,487 | 7/1988 | Karlinski ........................ 219/121.63 X |
| 5,231,260 | 7/1993 | Yoshie et al. ...................... 219/121.63 |
| 5,238,172 | 8/1993 | Davay ................................. 228/148 X |

FOREIGN PATENT DOCUMENTS

| 2677137 | 12/1992 | France . |
| 61-67586 | 4/1986 | Japan . |

*Primary Examiner*—Gregory L. Mills
*Attorney, Agent, or Firm*—Sughrue, Mion, Zinn, Macpeak & Seas, PLLC

[57] ABSTRACT

A repair line for repairing a closure defect in a metal tube containing at least one transmission optical fiber which includes a repair station having a tube conditioning system for bending and tensioning a portion of the tube including the defect and a laser for welding point by point along the defect with the minimum heat input at each point.

19 Claims, 3 Drawing Sheets

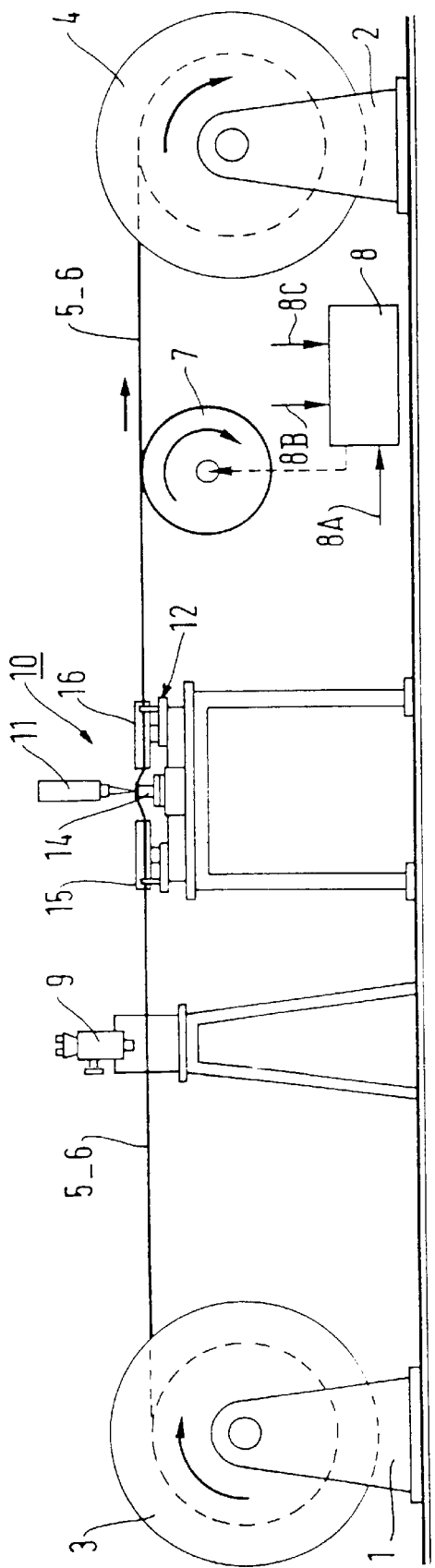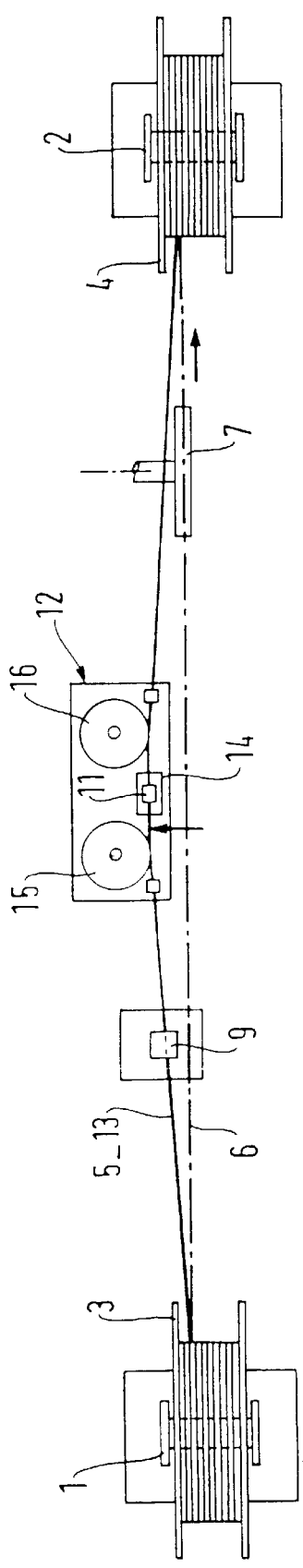

LASER WELDING LINE FOR REPAIRING A CLOSURE FAULT OF A METAL TUBE CONTAINING AT LEAST ONE TRANSMISSION OPTICAL FIBER

This is a divisional of application Ser. No. 08/501,296 filed Jul. 12, 1995, now U.S. Pat. No. 5,700,990.

BACKGROUND OF THE INVENTION

1. Field of the Invention

The present invention concerns a method and line for repairing a closure fault of a metal tube containing at least one transmission optical fiber.

2. Description of the Prior Art

Transmission optical fibers, especially in a submarine optical fiber cable, are contained in one or more metal (for example steel) tubes providing sealed mechanical protection around the fibers within the structure of the cable.

The operation of inserting an optical fiber into a metal tube is known in itself and is described in document EP-A-0 299 123, for example. It is carried out continuously on a fiber insertion line. It consists in deforming a flat metal strip into the shape of a longitudinally open tube, guiding the fiber into the open tube and closing the tube lengthwise by laser welding the edges of the opening. An auxiliary tube enters the open metal tube and extends within the latter beyond the laser. It introduces and guides the fiber into the metal tube.

This operation is usually followed by a check on correct closure of the metal tube to achieve the required protection of the fiber. This detects any closure defects along the tube and memorizes their position, so that the defects can be repaired later.

A closure defect in the tube can be repaired by fitting an external sleeve to the defective area. This leads to a localized increase in the overall size of the repaired tube, which is often incompatible with its use, especially Within the structure of a submarine cable.

A repair can instead be effected by cutting the metal tube and the fiber on either side of the defective area, which is removed, and then making a joint.

Document U.S. Pat. No. 5,076,657 describes a joint of this kind, which does not cause any increase in the overall size of the tube at the location of the joint. The joint is made using a sleeve to protect the ends of the cut fiber, which are welded together, and to re-establish the continuity of the cut tube. The sleeve is welded to the end parts to be joined of this tube and its diameter is made the same as the outside diameter of the tube by mechanical means. The joint can instead be made with no sleeve, by reducing the outside diameter of one of the end parts of the cut tube, inserting this end part into the other end part of the cut tube and welding them together. In a joint of this kind the inside dimensions of the repaired tube are reduced where the two cut end parts overlap.

These prior art repair methods are time-consuming and difficult. They entail the risk of damage to the interior fiber. Also, the same metal tube often contains a plurality of transmission optical fibers, which makes repairing the metal tube closure defect even longer and more difficult An object of the present invention is to avoid the above-mentioned disadvantages, to carry out the repair quickly, easily and reliably, without modifying the outside and/or inside dimensions of the tube, and with the minimum risk of deterioration of the transmission characteristics of the fiber or fibers inside the tube.

SUMMARY OF THE INVENTION

The invention consists in a method of repairing a closure defect of a metal tube containing at least one transmission optical fiber, said defect being situated on a closure generatrix of said tube, by bending and applying mechanical tension to a portion of said tube including said defect to make the closure generatrix convex to force each fiber inside it at this location to be positioned against said tube on the side opposite said defect, and laser welding said defect point by point using heat input at each point adjusted to substantially the value required for the weld.

In another aspect, the invention consists in a repair line for implementing the above method which includes respective loading stations for a feed spool and a take-up spool for said tube, means for feeding said tube along a direct path between said spools coupled to a system controlling movement along and stopping of said tube on said path, a repair station offset relative to said path on a repair path, a laser for welding said tube point by point and a tube conditioning system for bending the tube and applying mechanical tension to it opposite said laser.

This repair line advantageously has at least one of the following further features:

said conditioning system includes a support member for said tube having a front face of substantially convex longitudinal shape and first and second means for guiding and tensioning sand tube mounted on opposite sides of said support member and defining said repair path with said support member;

said first and second guide and tensioning means are mobile relative to each other on said repair path in a direction X defined by said path;

it further includes at least one first device for feeding the tube in translation in the direction X connected to said first and second guide and tensioning means;

it includes a first support constituted by a motorized table coupled to a second device for feeding the tube in translation in the direction X and carrying said first and second feed devices fixed to said motorized table and said support member and a second support constituted by a fixed main support carrying said motorized table and said first and second guide and tensioning means which are movable in the direction X on said main support; the second feed device preferably being a stepper motor;

said repair line further includes a third support constituted by a plate mobile in a direction Y transverse to said direction X on said motorized table and actuated in said direction Y by a third feed device, said bending means being carried by and fixed to said plate.

The features and advantages of the present invention will emerge from the following description of one embodiment of the invention given by way of example and shown in the appended drawings.

BRIEF DESCRIPTION OF THE DRAWINGS

FIGS. 1 and 2 are diagrammatic front and top views of a repair line in accordance with the present invention.

DETAILED DESCRIPTION OF THE PREFERRED EMBODIMENT

Figure 3:
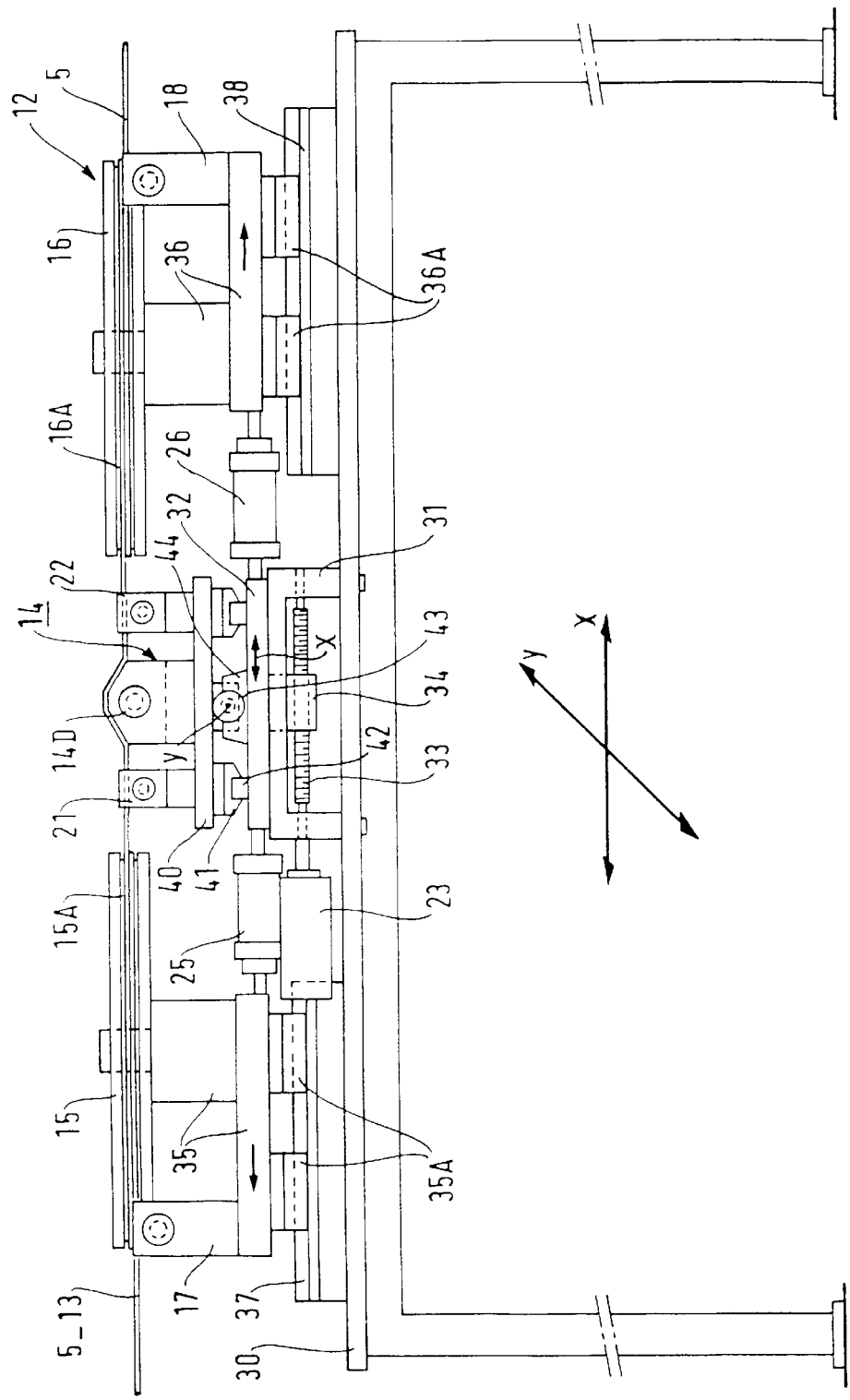
FIGS. 3 and 4 are diagrammatic partial front and top views of a repair station in that line.

Referring to FIGS. 1 and 2, it can be seen that the repair line includes two loading stations 1 and 2 for a feed spool 3 and a take-up spool 4 of metal tube 5 containing at least one transmission optical fiber, not visible. The two spools define between them a direct feed path 6 of the tube to be repaired, fed from the spool 2 and stored after repairing the defects on the spool 4. A capstan 7 draws the tube along the path 6. It is connected to a control system 8 to feed the tube from the spool 3 and to stop it at a defect in the tube.

The tube on the spool 2 has previously been closed around the fibers along a closure generatrix. The defects to be repaired correspond to locally imperfect closure of the tube.

The system 8 is connected to an external link 8A transmitting to it the positions of the various defects along the tube stored on he spool 3. These positions are detected during insertion of the optical fiber or fibers into the metal tube. Their positions along the tube are memorized in a memory unit associated with this system (not shown). The system 8 stops the tube at each closure defect on the portion of the tube between the spools 3 and 4.

The line includes a station 9 for observation of the defects, situated on the downstream side of the feed spool, and a repair station situated between the observation station and the capstan 7, set back from the direct feed path 6 of the tube. The tube is moved between the two stations manually.

The observation station 9 includes a microscope enabling an operator to judge the feasibility of repairing the defect observed. It is preferably associated with an input 8B for enabling execution of the repair and/or an input 8C for cancelling the repair on the control unit 8 or alternatively on the associated memory unit. The enabling signal extends the time for which the tube is stopped on the path 6, so that the repair can be carried out. The cancel signal causes the tube to be fed without repairing the defect and the position of the unrepaired defect to be retained in memory.

The repair station 10 includes a laser 11 for welding the tube point by point and a system 12 for conditioning the tube 5 facing the laser 11. The laser 11 and the system 12 are on opposite sides of a diverted repair path 13, the laser 31 being over this path and the system 12 below it. In this embodiment this path is to the rear of the path 6.

The system 12 includes means 14 for bending the tube 5 facing the laser 11 and means 15 and 16 for guiding and tensioning the tube over the bending means, these three units defining the repair path 13 between them.

At a defect to be repaired, feeding of the tube 5 is stopped and the tube is free on the path 6. It is picked up and moved by hand from the path 6 to the repair path 13, in which the defect is under the laser, as shown in FIG. 2. It is then tensioned on the repair path by the guide and tensioning means 15 and 16. In the curved portion under the laser the fibers inside the tube are pressed against the wall of the tube on the side opposite the defeat and the laser, and are therefore as far away from the laser as possible.

The defect is repaired by welding point to point with the laser, the heat input at each point being adjusted to the minimal value required for the weld. The maximal distance of the fibers from the laser and the minimal heat input at each point eliminate all significant risk of damage to the fibers inside the tube.

The repair is carried out over the full extent of the defect by successive small amplitude displacements of the tube or of the laser relative to each other, the extent of the defect necessarily being small if the repair is feasible. These displacements are in the axial direction of the tube on the repair path and preferably also in the transverse direction. To this end the system 12 is advantageously mobile in these two directions and the laser is fixed. Alternatively the laser can be mobile and the system fixed, or mobile in one of these two directions.

Figure 4:
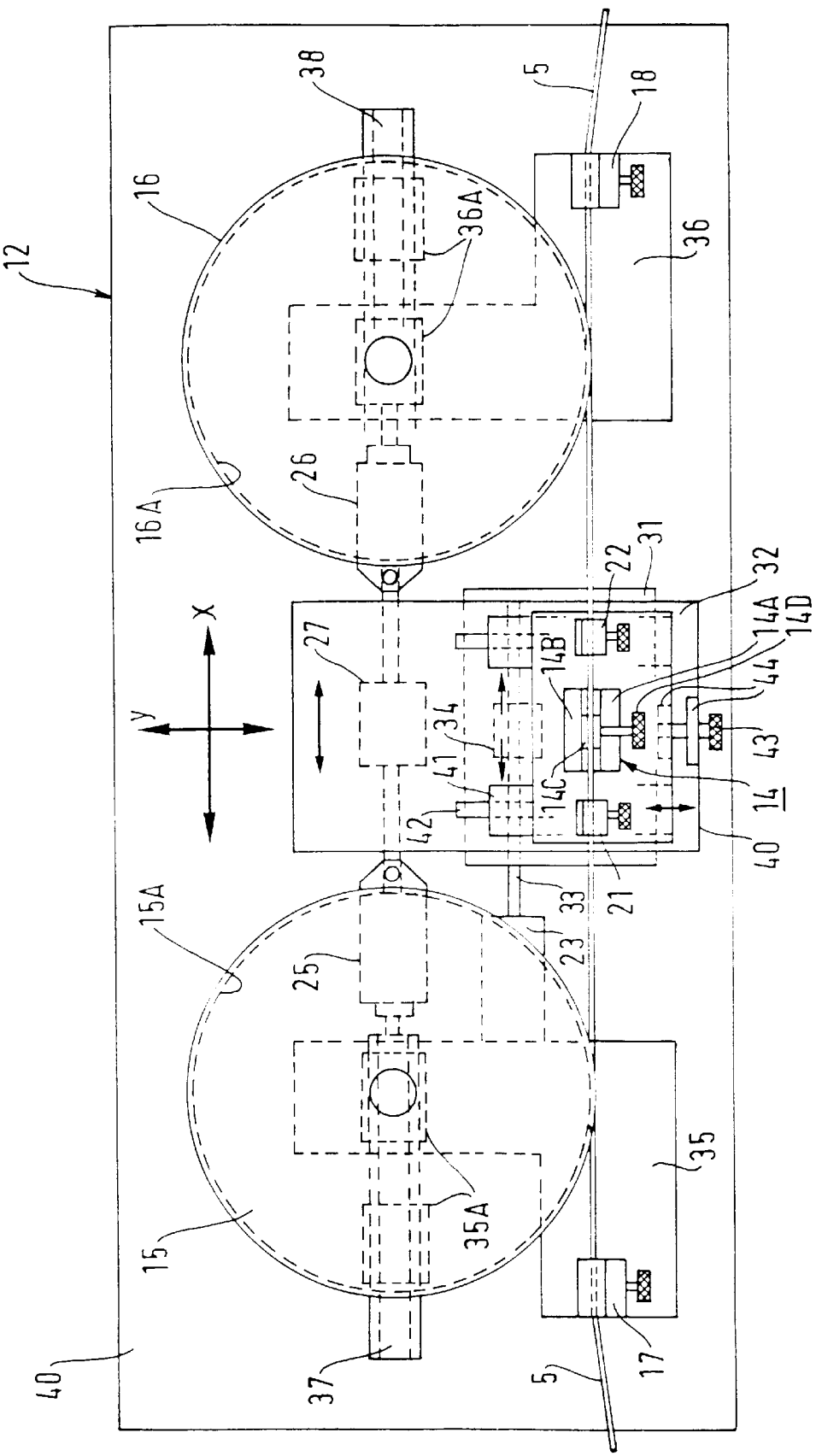

FIGS. 3 and 4 show a preferred embodiment of the system 12.

In the system 12, the means 14 for bending the tube comprise a support member in two parts, a fixed part 14A and a mobile part 14B, to facilitate application to and removal of the tube from its front face, opposite the laser, and holding the tube when the mobile part is in the closed position. It comprises a vise in which the front face of the fixed jaw 14A has a shoulder facing the mobile jaw 14B. When the vise is closed the mobile jaw and the fixed jaw together define a front groove 14C the width of which is substantially equal to the diameter of the tube.

The groove has a convex overall shape to bend the tube. To be more precise, its middle part is flat and its two end parts on either side of the middle part are curved. The mobile jaw is moved by a screw 14D.

The guide and tensioning means 15 and 16 are two pulleys each having a peripheral groove 15A or 16A receiving the tube. One of the pulleys is (or preferably both of them are) mobile in translation to move them apart and thereby to tension the tube between them on the vise 14.

Two guide flanges 17 and 18 are associated with the pulleys and mounted on either side of them on the path 13. Two other guide flanges 21 and 22 are associated with the vise and mounted on either side of it. These flanges guarantee that the tube is held correctly on the path 13.

In the embodiment shown both pulleys have a vertical axis, to minimize the overall size. They lie to the rear of the path 13. As an alternative they can have a horizontal axis in which case they lie under the path 13 and therefore at least for the most part under the direct feed path 6 of the tube.

The tube is fitted to the pulleys, preferably making a complete turn around each of them to prevent it slipping when it is tensioned by moving the pulleys apart. The width of the groove is substantially twice the diameter of the tube in the part tangential to the path 13.

A stepper motor 23 moves the pulleys and the vise in either sense along the direction X defined by the path 13. Respective cylinders 25 and 26 are associated with the two pulleys and move them symmetrically further apart or closer together.

To hold and move the pulleys and the vise, the system 12 includes a main fixed support 30 having a horizontal support surface and an auxiliary support 31 fixed to it and also having a horizontal support surface. It also includes a motorized table 32 mobile on the auxiliary support and driven in one sense or the other in direction X.

As shown, for control of translatory movement of the motorized table by fixing means 27, a lead screw 33 is rotated by the motor shaft and drives in translation a rack 34 meshing with the screw and fastened to the motorized table.

The two cylinders 25 and 26 are fastened to the motorized table by the fixing means 27 and are symmetrically arranged on opposite sides of the table. In this example they are preferably electrically operated cylinders, but alternatively they are controlled by individual screws or they are of a different type. They move the pulleys in translation by the same amount in opposite directions.

The pulleys 15 and 16 are carried by respective support arms 35 and 36 which are moved directly in the X direction by the cylinders. These support arms also carry the guide flanges 17 and 18. They are mobile in translation on respective slideways 37 and 38 carried by the main support 30 and to this end carry guide skids 35A, 36A, etc engaging with their slideway.

The vise 14 is mounted on a support plate 40. This plate is carried by the motorized table and is mobile in translation in direction Y perpendicular to the path 13. To this end two skids 41 are attached to the plate and received in two slideways 42 attached to the motorized table. The plate is moved by a micrometer screw 43 passing through a pair of coupling members 44, not referenced separately, one of these members being attached to the plate and driven by the screw and the other attached to the table and having the screw pass freely through it.

The micrometer feed plate 40 also carries the two flanges 21 and 22.

The fixed jaw 14A defines the base of the vise and is fixed directly to the plate 40. The mobile jaw 14B is opened or closed relative to the fixed jaw by the actuator screw 14D.

This arrangement of the vise and the pulleys of system 12:

by controlling the two cylinders, applies tension to the tube between the two pulleys and in the vise throughout the repair, by controlling the motor 23, moves the assembly in the X direction and thereby moves the tube in front of the fixed laser, for welding along the defect as the latter is displaced under the laser, by actuation of the screw 43, moves the tube in the Y direction under the laser for the weld to be made over the width of the defect.

The tensioned tube is fixed to the pulleys throughout the repair. When the repair is finished the cylinders move the two pulleys towards each other to slacken off the tube and allow it to be removed from the path 13 and fed along the path 6 for storage on the spool 3.

The repair method of the invention avoids any change to the inside and/or outside dimensions of the tube and prevents the risk of damage to the fibers during laser welding and during storage of the tube on the spool after repair and subsequent manipulations. It represents a significant time saving compared to prior art repair methods and yields a long tube free of defects and without any localized increase in the inside or outside dimensions, ready for use in a cable manufactured in long lengths.

There is claimed:

1. Laser welding line for repairing a closure fault of a metal tube containing at least one optical fiber, said fault being situated on a closure generatrix of said tube, wherein the line comprises respective leading stations for a feed spool and a take-up spool for said tube, means for feeding said tube along a direct path between said spools, a control system for controlling movement along and stopping of said tube on said direct path, a repair path offset relative to said direct path and provided with a repair station, wherein said repair station comprises a tube conditioning system for axially bending and applying mechanical tension to a portion of said tube including said fault to make said closure generatrix convex and to force each fiber inside said tube at said fault location to be positioned against said tube on the side opposite said fault, and a laser for welding said fault point within the convex portion using heat input at each point adjusted to substantially the minimum value required for the weld at said each point.

2. Repair line for implementing a method of repairing a closure defect of a metal tube containing at least one transmission optical fiber, said defect being situated on a closure generatrix of said tube, by bending and applying mechanical tension to a portion of said tube including said defect to make said closure generatrix convex to force each fiber inside the tube at the location of said defect to be positioned against said tube on the side opposite said defect, and laser welding said defect point by point using heat input at each point adjusted to substantially the value required for the weld, which repair line includes respective leading stations for a feed spool and a take-up spool for said tube, means for feeding said tube along a direct path between said spools coupled to a system controlling movement along and stopping of said tube on said path, a repair station on a repair path which is offset relative to said path, a laser for welding said tube point by point and a tube conditioning system for bending said tube and applying mechanical tension to said tube opposite said laser, wherein said conditioning system includes a support member for said tube having a front face of substantially convex longitudinal shape and first and second means for guiding and tensioning said tube mounted on opposite sides of said support member and defining said repair path with said support member.

3. Repair line according to claim 2 wherein said first and second guide and tensioning means are mobile relative to each other on said repair path in a direction X defined by said path.

4. Repair line according to claim 3 further including at least one first device for feeding said tube in translation in said direction X connected to said first and second guide and tensioning means.

5. Repair line according to claim 4 including a first support constituted by a motorized table coupled to a second device for feeding said tube in translation in said direction X and carrying said first and second feed devices fixed to said motorized table and said support member and a second support constituted by a fixed main support carrying said motorized table and said first and second guide and tensioning means which are movable in said direction X on said main support.

6. Repair line according to claim 5 wherein said main support carries sideways receiving guide skids attached to said guide and tensioning means.

7. Repair line according to claim 5 wherein said second feed device is a stepper motor.

8. Repair line according to claim 5 further including a third support constituted by a plate mobile in a direction Y transverse to said direction X on said motorized table and actuated in said direction Y by a third feed device, said bending means being carried by and fixed to said plate.

9. Repair line according to claim 8 wherein said third feed device is a micrometer feed screw passing through a pair of members one of which is attached to said plate and the other of which is attached to said motorized table.

10. Repair line according to claim 8 wherein said plate and said motorized table are provided with complementary means for guiding said plate on said table.

11. Repair line according to claim 2 further including at least one auxiliary means for guiding said tube on said repair path at least one of which is fixed relative to said support member.

12. Repair line according to claim 2 wherein said first and second guide and tensioning means are two pulleys having a peripheral groove for receiving said tube in a slip-free manner.

13. Repair line according to claim 2 wherein said support member is a vise having a fixed jaw, a mobile jaw, a screw for actuating said mobile jaw and a convex groove on said front face defined by said mobile jaw in the closed position against said fixed jaw.

14. Repair line according to claim 2 further including a station for visual observation of a defect between said feed spool and said repair station.

15. Repair line according to claim 14 wherein said control system is coupled to an external link for transmitting the position of each defect along the tube on said feed spool.

16. Repair line according to claim 15 wherein said control system includes at least one input for enabling and cancelling repair, activated by an operator after observing each defect.

17. Repair line, for implementing a method of repairing a closure defect of a metal tube containing at least one transmission optical fiber, comprising respective loading stations for a feed spool and a take-up spool for the tube, a feed mechanism that moves the tube along a direct path between said spools, said feed mechanism is coupled to a system that controls movement along and stops said tube on said path, a repair station offset relative to said direct path on a repair path, a laser mounted to said repair station to weld said tube point by point, and a tube conditioning system which bends said tube and applies mechanical tension to said tube opposite said laser, wherein said conditioning system includes a support member having a curved longitudinal shape.

18. Repair line according to claim 17, wherein said curved longitudinal shape is convex.

19. Repair line according to claim 17, wherein said repair path is laterally offset from said direct path.

\* \* \* \* \*